United States Patent
Yu et al.

(10) Patent No.: US 7,093,971 B2
(45) Date of Patent: Aug. 22, 2006

(54) BACKLIGHT UNIT FOR CHANGING LAMPS THEREIN CONVENIENTLY

(75) Inventors: Chuan-Pei Yu, I-Lan Hsien (TW); Han-Chou Liu, Hsin-Chu (TW); Chien-Hung Kuo, Tai-Chung Hsien (TW)

(73) Assignee: AU Optronics Corp., Hsin-Chu (TW)

( * ) Notice: Subject to any disclaimer, the term of this patent is extended or adjusted under 35 U.S.C. 154(b) by 125 days.

(21) Appl. No.: 10/604,854

(22) Filed: Aug. 21, 2003

(65) Prior Publication Data

US 2004/0223313 A1  Nov. 11, 2004

(30) Foreign Application Priority Data

May 9, 2003  (TW) ............................... 92112747 A

(51) Int. Cl.
*G02F 1/1333* (2006.01)
*G02F 1/1335* (2006.01)

(52) U.S. Cl. .................. 362/633; 362/632; 362/634; 349/58

(58) Field of Classification Search ............... 362/31, 362/27, 29, 331, 346, 660, 633, 613; 349/58; 206/122, 418, 421
See application file for complete search history.

(56) References Cited

U.S. PATENT DOCUMENTS 5,666,172 A * 9/1997 Ida et al. ...................... 349/58
6,407,781 B1 * 6/2002 Kitada ......................... 349/58
6,561,663 B1 * 5/2003 Adachi et al. ................ 362/31
6,979,114 B1 * 12/2005 Kao ............................ 362/633
2002/0030993 A1 * 3/2002 Itoh ............................ 362/246

FOREIGN PATENT DOCUMENTS

JP  10-289606  10/1998

* cited by examiner

*Primary Examiner*—Sandra O'Shea
*Assistant Examiner*—Anabel Ton
(74) *Attorney, Agent, or Firm*—Winston Hsu

(57) ABSTRACT

A backlight unit includes at least an optical sheet and a diffusion plate fixed to a backside of a display panel, the optical sheet and the diffusion plate forming an upper module with the display panel. The backlight unit further includes a bottom frame positioned below the upper module and a plurality of lamps positioned within the bottom frame. The backlight unit is capable of changing the lamps within the bottom frame after removal of the upper module above the bottom frame. Therefore, it is not necessary to separate the elements such as the optical film and the diffusion plate from the bottom frame individually and the device pollution or destruction can be prevented.

14 Claims, 5 Drawing Sheets

BACKLIGHT UNIT FOR CHANGING LAMPS THEREIN CONVENIENTLY

BACKGROUND OF INVENTION

1. Field of the Invention

The present invention relates to a backlight unit of a plane display, and more particularly, to a backlight unit for changing lamps therein conveniently.

2. Description of the Prior Art

Backlight units are known in the art. The backlight unit, which is a key element in the fabrication of liquid crystal displays, is widely used in digital cameras, PDAs, vehicle satellite navigation systems, computer monitors, flat panel TVs and so on. Typically, a backlight unit, which is generally installed underneath a display panel, comprises a light source (or multiple light sources) and a light diffusion means for providing a uniformly distributed light source. According to the position of the light source, backlight units are typically divided into two major categories: edge light type and direct-type, wherein the direct-type backlight unit can provide higher intensity of light and is thus more suited for large size display panels, such as display panels or TV panels, than the edge light type.

Referring to FIG. 1 of a cross-sectional diagram of a direct-type backlight unit according to the prior art, a display 10 includes a display panel 12, an optical sheet composed of a diffuser sheet 14 and a prism sheet 16, and a diffusion plate 18 positioned on a backside of the display panel 12. A plurality of lamps 20 are positioned within a bottom frame 26, and a reflecting sheet 22 is positioned on an inner surface of the bottom frame 26. The bottom frame 26 is combined with a top frame 24, so as to fix the display panel 12 with the underneath elements of the backlight unit.

The reflecting sheet 22 reflects light from the lamps 20 to improve light utility. The diffusion plate 18 diffuses the reflected light into uniformly distributed light. Normally, the diffusion plate 18 is made of acrylic or polycarbonate (PC) materials with a transmittance of approximately between 50% and 80%. In order to provide more uniform light, a surface of the diffusion plate 18 can be further printed with inks to form distributed dots thereon. The diffuser sheet 14 is made of polyethylene terephthalate (PET) or polycarbonate materials with a thickness of approximately between 0.11 and 0.15 mm. The prism sheet 16 is made of polyester or polycarbonate materials to collect light and thus enhance front brightness of the display.

Since the backlight unit has heat radiation problems and the users always demand longer and longer product lifespan to the displays, it is not easy to ensure that each lamp within the backlight unit has the same lifespan. When one of the lamps is broken, it is necessary to prepare tools such as a screwdriver to separate the display panel, the diffuser sheet, the prism sheet and the diffusion plate from the backlight unit individually and carefully to change a new lamp. The procedure of changing the new lamp is not only very troublesome but also possible to result in device pollution or destruction to affect the quality of the display. Sometimes the users may directly change the entire backlight unit because of not knowing how to change the lamps within the backlight unit, resulting in unnecessary waste.

SUMMARY OF INVENTION

It is therefore an object of the claimed invention to provide a backlight unit capable of changing lamps therein conveniently to solve the above-mentioned problems.

According to the claimed invention, the backlight unit includes at least an optical sheet and a diffusion plate fixed to a backside of a display panel, and the optical sheet and the diffusion plate form an upper module with the display panel. The backlight unit further includes a bottom frame positioned below the upper module and a plurality of lamps positioned within the bottom frame. The backlight unit is capable of changing the lamps within the bottom frame after removal of the upper module above the bottom frame. Therefore, it is not necessary to separate the elements such as the optical film and the diffusion plate from the bottom frame individually and the device pollution or destruction can be prevented.

An external electrode fluorescent lamp (EEFL) can be selected to replace the conventional cold cathode fluorescent lamp (CCFL) in the backlight unit of the present invention. Appropriate buffer sheets may also be positioned on portions of surfaces contacting with the lamps, so as to prevent collision damages to the lamps. In addition, a conductive clip is introduced to contact with an external electrode of the lamps and connects the lamps to an inverter according to the present invention, so as to reduce high voltage wires and simplify the procedure of changing the lamps.

It is an advantage of the present invention that the backlight unit fixes the optical sheet and the diffusion plate to the backside of the display panel to form the upper module. When changing lamps, the entire upper module is removed easily. Therefore, it is not necessary to strip down the elements such as the display panel, the optical sheet and the diffusion plate individually. As a result, device pollution and destruction resulted from the stripping procedure can be effectively prevented, so as to ensure the good quality of the display.

These and other objects of the claimed invention will be apparent to those of ordinary skill in the art after reading the following detailed description of the preferred embodiment that is illustrated in the various figures and drawings.

DETAILED DESCRIPTION

Figure 1:
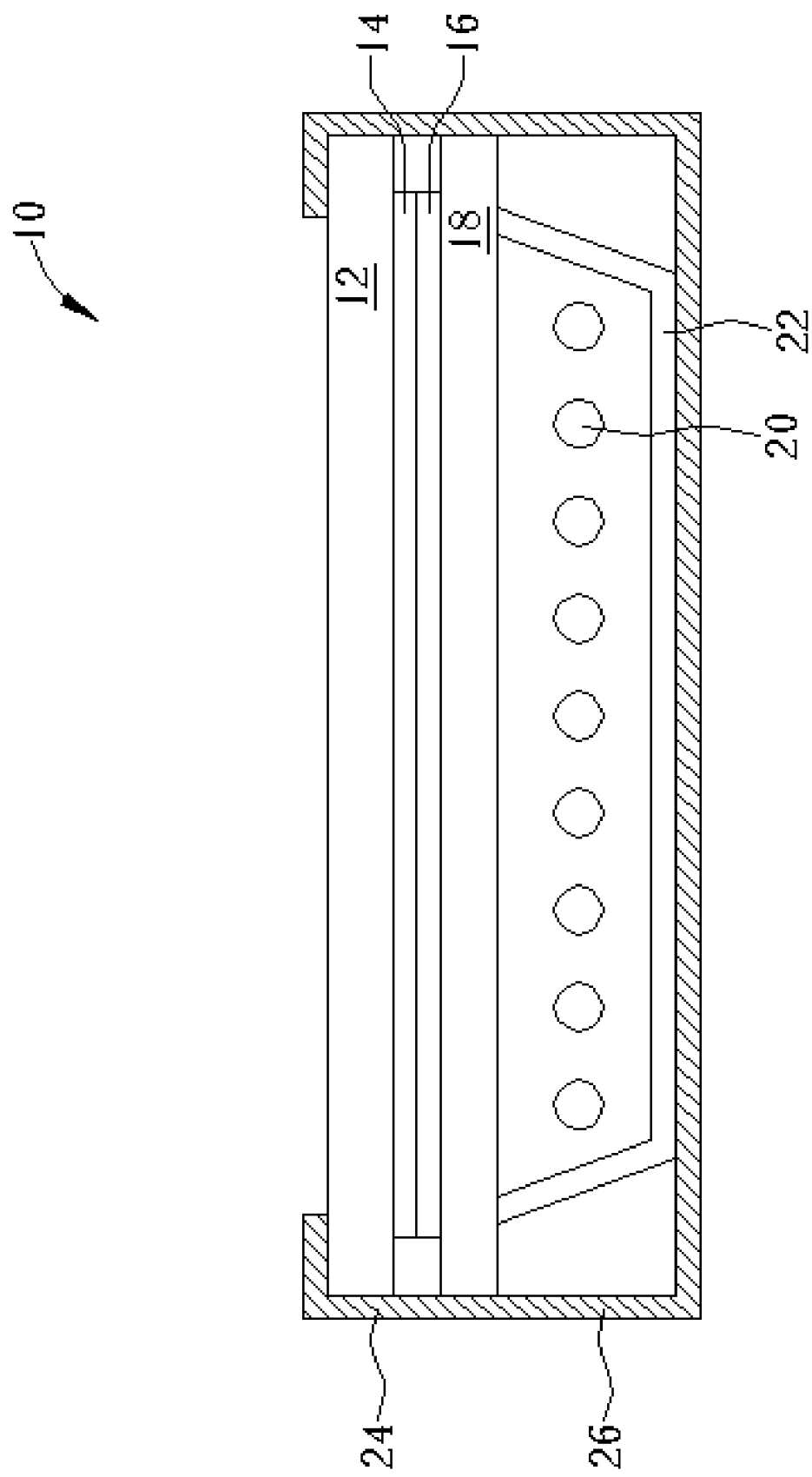
FIG. 1 is a cross-sectional diagram of a backlight unit according to the prior art.
Figure 2:
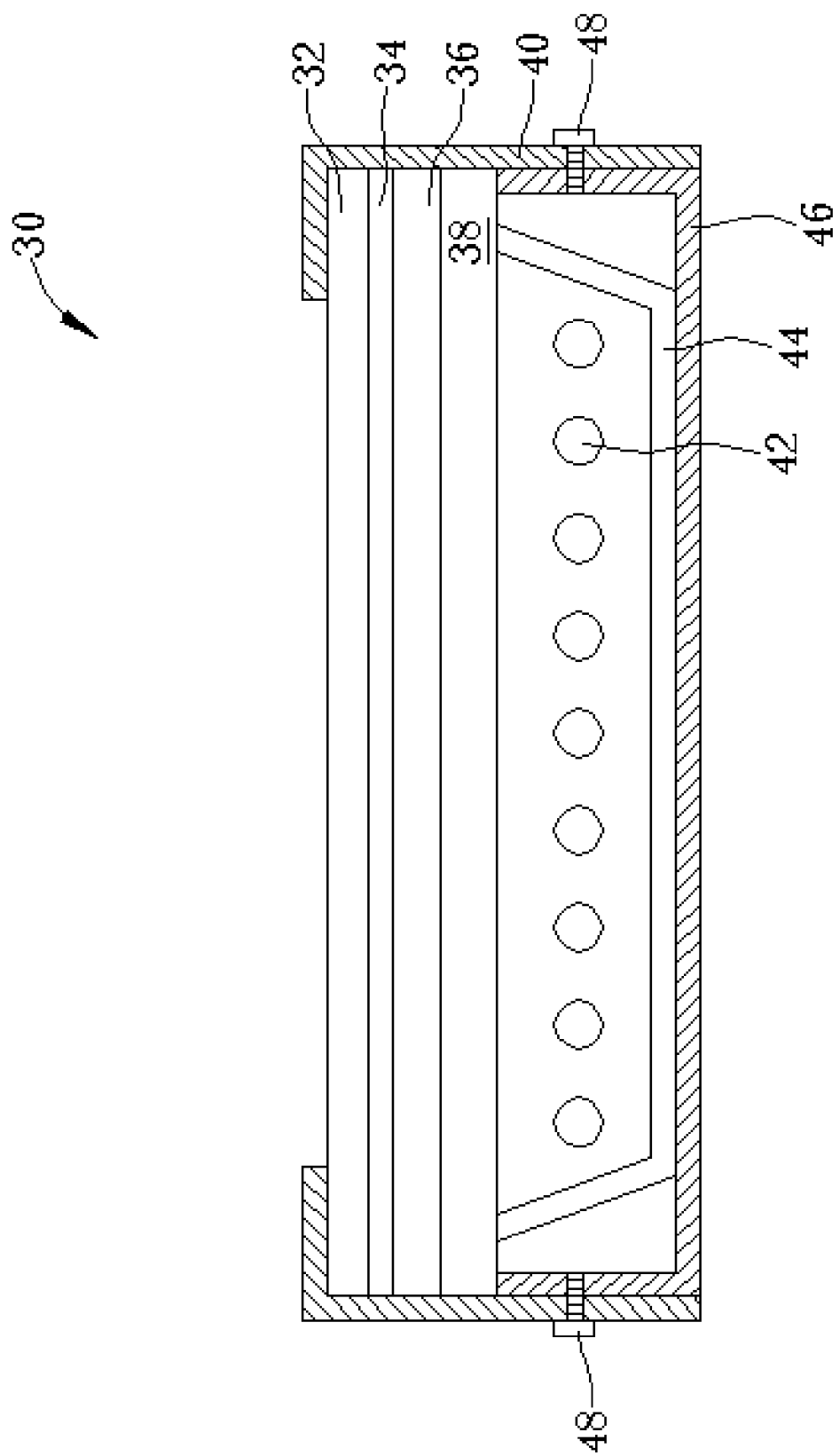
FIGS. 2 and 3 are cross-sectional diagrams of a backlight unit according to the present invention.
Figure 3:
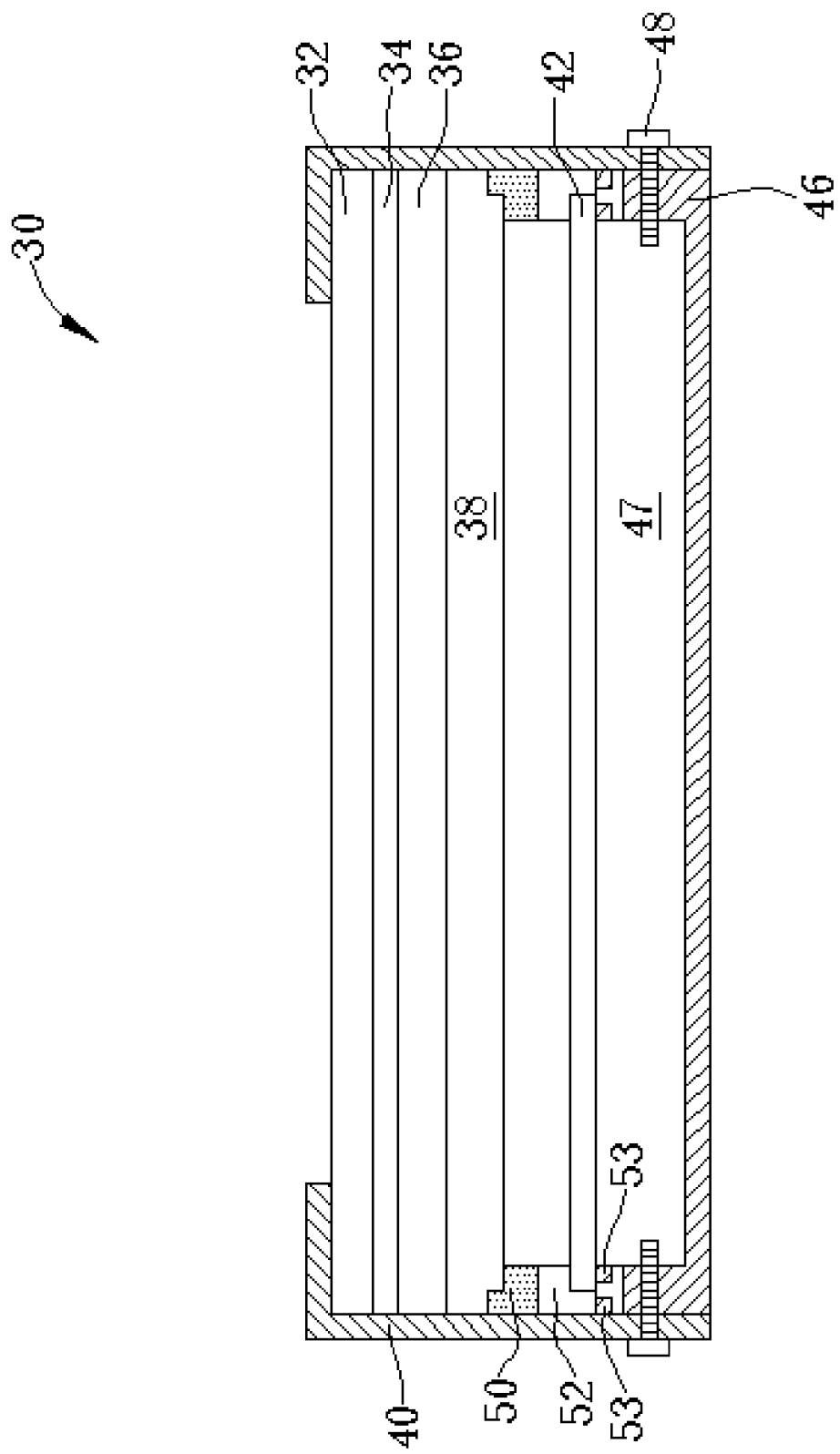

Referring to FIGS. 2 and 3, FIGS. 2 and 3 are cross-sectional diagrams of a backlight unit of a rectangular plane display having two longer sides and two shorter sides according to the present invention. FIG. 2 is a cross-sectional diagram along the longer sides of the display, and FIG. 3 is a cross-sectional diagram along the shorter sides of the display. As shown in FIGS. 2 and 3, a display 30 includes a display panel 32, an optical sheet composed of a diffuser sheet 34 and a prism sheet 36, a diffusion plate 38 positioned on a backside of the display panel 32, a plurality of lamps 42 positioned within a bottom frame 46, and a reflecting sheet 44 positioned on an inner surface of the bottom frame 46 to surround the lamps 42.

A plurality of fixing elements 50 are used to fix the display panel 32, the diffuser sheet 34, the prism sheet 36 and the diffusion plate 38 to an inner surface of a top frame 40, thus forming an upper module. A length of the upper module is approximately greater than a length of the bottom frame 46, so that the top frame 40 can be fixed to an outer surface of the bottom frame 46 using a plurality of screws 48, or to the bottom frame 46 and a plastic frame 48 within the bottom frame 46 at the shorter sides of the display 30. In a better embodiment of the present invention, a plurality of buffer sheets 52 are pasted up on lower surfaces of the fixing elements 50 or other regions contacting with end electrodes of the lamps 42. For example, a plurality of buffer sheets 53 are pasted up on portions of the bottom frame 46 and the plastic frame 47, so as to prevent collision damages to the lamps 42.

Figure 4:
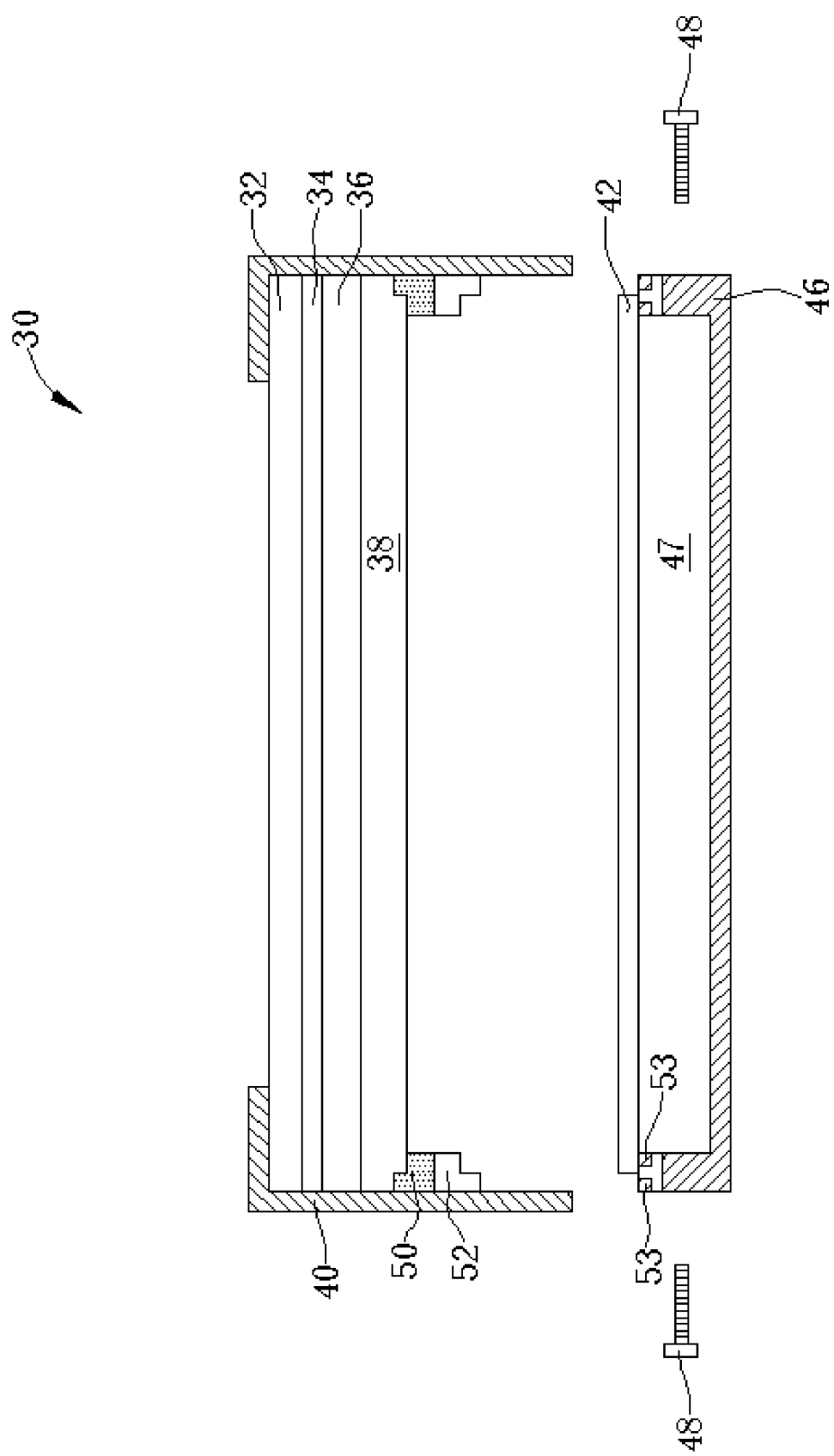
FIG. 4 is a schematic diagram for changing lamps in a backlight unit according to the present invention.

Referring to FIG. 4, a schematic diagram for changing lamps in the backlight unit shown in FIG. 3 is illustrated. Since the fixing elements 50 are used to fix the diffuser sheet 34, the prism sheet 36 and the diffusion plate 38 to the display panel 32 to form the upper module and fix the upper module to the top frame 40, the upper module can be separated from the bottom frame 48 merely loosing the screws 48. Therefore, the lamps 42 to be changed are easily exposed according to the present invention. It is not necessary to strip down the elements such as the display panel, the optical sheet and the diffusion plate individually as in the prior art. As a result, the lamps can be changed more efficiently and conveniently without lowering the good quality of the display according to the present invention.

Figure 5:
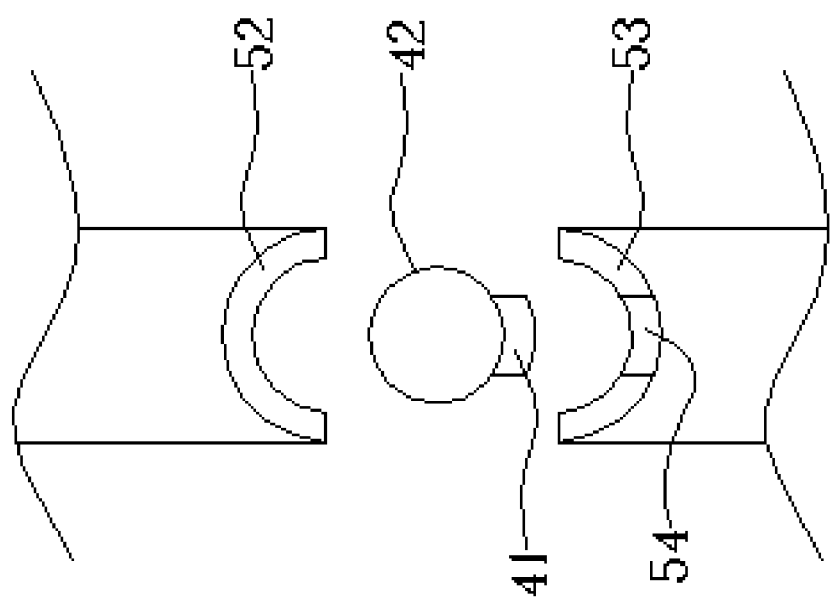
FIG. 5 is a partial-enlarged diagram of a backlight unit according to the present invention.

Referring to FIG. 5, a partial-enlarged diagram of a backlight unit of the present invention is illustrated. As shown in FIG. 5, appropriate buffer sheets 52 and 53 are positioned at the end electrodes of the lamps 42, so as to prevent the lamps 42 from colliding with other elements of the backlight unit when taking off the broken lamps 42 or putting down new lamps 42. In addition, an external electrode fluorescent lamp can be selected to replace the conventional cold cathode fluorescent lamp in the backlight unit of the present invention. In this case, a conductive clip 54 is introduced to contact with an external electrode 41 of the lamp 42, thus connecting the lamp 42 to an inverter (not shown). A high-voltage alternating current (AC) flows through the inverter, the conductive clip 54 to the lamp 42, and then flows back through the lamp 42, the conductive clip 54 to a low-voltage end of the inverter. As a result, the amounts of high-voltage wires can be reduced and the conventional soldering procedure of the lamps can be simplified to make it more convenient to change the lamps of the backlight unit.

In contrast to the prior art, the present invention fixes the optical sheet and the diffusion plate to the backside of the display panel to form the upper module. When changing lamps, the entire upper module is removed easily. Therefore, it is not necessary to strip down the elements such as the display panel, the optical sheet and the diffusion plate individually. As a result, the backlight unit of the present invention is capable of changing lamps therein conveniently, and the device pollution and destruction resulted from the stripping procedure can be prevented, so as to ensure the good quality of the display.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A backlight unit for changing lamps therein conveniently, the backlight unit comprising:

at least an optical sheet and a diffusion plate fixed to a backside of a display panel, the optical sheet and the diffusion plate forming an upper module with the display panel;

a top frame for accommodating and fixing the upper module;

a bottom frame positioned below the upper module and fixed to the top frame;

a plurality of lamps positioned within the bottom frame;

a plurality of buffer sheets positioned on portions of surfaces contacting with the lamps; and a plurality of fixing elements positioned on the top frame and the bottom frame for detachable connection of the bottom frame to the top frame;

wherein the backlight unit is capable of changing the lamps within the bottom frame after removal of the upper module above the bottom frame.

2. The backlight unit of claim 1 wherein the optical sheet comprises at least a diffuser sheet and a prism sheet.

3. The backlight unit of claim 1 wherein the bottom frame comprises a reflecting sheet surrounding the lamps.

4. The backlight unit of claim 1 wherein the top frame comprises a plurality of fixing elements for fixing the optical sheet and the diffusion plate to the backside of the display panel.

5. The backlight unit of claim 1 wherein the fixing elements comprise screws.

6. The backlight unit of claim 1 wherein the lamps comprise cold cathode fluorescent lamps.

7. The backlight unit of claim 1 wherein the lamps comprise external electrode fluorescent lamps.

8. The backlight unit of claim 7 wherein a conductive clip is positioned at an external electrode of the external electrode fluorescent lamps to simplify procedures of changing the lamps.

9. A backlight unit for changing lamps therein conveniently, the backlight unit comprising:

at least an optical sheet and a diffusion plate fixed to a backside of a display panel, the optical sheet and the diffusion plate forming an upper module with the display panel;

a top frame for accommodating and fixing the upper module, wherein the top frame comprises a plurality of first fixing elements for fixing the optical sheet and the diffusion plate to the backside of the display panel;

a bottom frame positioned below the upper module and fixed to the top frame;

a plurality of lamps positioned within the bottom frame; and a plurality of second fixing elements positioned on the top frame and the bottom frame for detachable connection of the bottom frame to the top frame;

wherein the backlight unit is capable of changing the lamps within the bottom frame after removal of the upper module above the bottom frame.

10. A backlight unit for changing lamps therein conveniently, the backlight unit comprising:

at least an optical sheet and a diffusion plate fixed to a backside of a display panel, the optical sheet and the diffusion plate forming an upper module with the display panel;

a top frame for accommodating and fixing the upper module;

a bottom frame positioned below the upper module and fixed to the top frame;

a plurality of lamps positioned within the bottom frame; and a plurality of screws positioned on the top frame and the bottom frame for detachable connection of the bottom frame to the top frame;

wherein the backlight unit is capable of changing the lamps within the bottom frame after removal of the upper module above the bottom frame.

11. A backlight unit for changing lamps therein conveniently, the backlight unit comprising:

at least an optical sheet and a diffuslon plate fixed to a backside of a display panel, the optical sheet and the diffusion plate forming an upper module with the display panel;

a top frame for accommodating and fixing the upper module; p1 a bottom frame positioned below the upper module and fixed to the top frame;

a plurality of external electrode fluorescent lamps positioned within the bottom frame, wherein a conductive clip is positioned at an external electrode of the external electrode fluorescent lamps to simplify procedures of changing the lamps; and a plurality of fixing elements positioned on the top frame and the bottom frame for detachable connection of the bottom frame to the top frame;

wherein the backlight unit is capable of changing the lamps within the bottom frame after removal of the upper module above the bottom frame.

12. The backlight unit of claim 9 wherein the optical sheet comprises at least a diffuser sheet and a prism sheet.

13. The backlight unit of claim 10 wherein the optical sheet comprises at least a diffuser sheet and a prism sheet.

14. The backlight unit of claim 11 wherein the optical sheet comprises at least a diffuser sheet and a prism sheet.

* * * * *